United States Patent [19]
Marcos

[11] Patent Number: 5,133,182
[45] Date of Patent: Jul. 28, 1992

[54] CONTROL OF LOW COMPRESSOR VANES AND FUEL FOR A GAS TURBINE ENGINE

[75] Inventor: Juan A. Marcos, Jupiter, Fla.

[73] Assignee: United Technologies Corporation, Hartford, Conn.

[21] Appl. No.: 448,391

[22] Filed: Dec. 11, 1989

Related U.S. Application Data

[63] Continuation-in-part of Ser. No. 246,730, Sep. 20, 1988, abandoned.

[51] Int. Cl.⁵ .............................................. F02C 9/54
[52] U.S. Cl. .............................. 60/39.161; 60/39.27
[58] Field of Search ............. 60/226.1, 39.161, 39.27, 60/39.29

[56] References Cited

U.S. PATENT DOCUMENTS

| | | | |
|---|---|---|---|
| 2,931,168 | 4/1960 | Alexander et al. | 60/39.27 |
| 4,184,327 | 1/1980 | Cornett et el. | 60/39.27 |
| 4,244,181 | 1/1981 | Wiher et al. | 60/39.161 |
| 4,299,088 | 11/1981 | Rowen et al. | 60/39.27 |
| 4,550,565 | 11/1985 | Ozono | 60/39.27 |
| 4,928,482 | 5/1990 | Pollak et al. | 60/39.27 |

Primary Examiner—Louis J. Casaregola
Attorney, Agent, or Firm—Norman Friedland

[57] ABSTRACT

Time responsiveness to thrust demands for a fan jet engine of the type that includes twin spools and a variable inlet at the fan is enhanced by regulating air flow through the variable inlet while holding low pressure compressor speed constant. The thrust change is targeted as a function of power lever position which generates a low pressure compressor parameter as a function of engine and aircraft operating variables. This parameter is then utilized to control both the inlet variable vanes and fuel flow to 1) attain the targeted value and 2) return the engine to its steady state operating line after a given time interval.

9 Claims, 3 Drawing Sheets

5,133,182

CONTROL OF LOW COMPRESSOR VANES AND FUEL FOR A GAS TURBINE ENGINE

CROSS-REFERENCE TO RELATED APPLICATIONS

This application is a continuation-in-part application of U.S. Ser. No. 246,730 filed on Sep. 20, 1988 (abandoned).

The subject matter of this application is related to the subject matter of commonly owned U.S. patent applications Ser. Nos. 246,728 (U.S. Pat. No. 4,928,482) and 246,765 (U.S. Pat. No. 4,947,643), both filed on Sep. 20, 1988 and entitled "Control of High Compressor Vanes and Fuel for a Gas Turbine Engine" and "Active Geometry Control System for Gas Turbine Engines", respectively.

TECHNICAL FIELD

This invention relates to fan jet two spool engines for powering aircraft and particularly to the control on an engine of the type that includes variable vanes at the inlet of the fan.

BACKGROUND ART

As is well known and historically, the control for the gas turbine engine has typically adjusted fuel flow in attempting to optimize operation of the engine. In a typical installation the fuel control monitors a plurality of engine operating parameters and processes these signals to produce outputs that would be indicative of a desired engine operation while assuring that the engine avoids surging, overheating and rich and lean flame out. To achieve this goal the computer portion of the control manifests a control logic that represents the operation of the engine and continuously schedules fuel flow to reflect the setting of the power lever. In engines, particularly of the military variety, the control also, independently, monitors engine variables to schedule the variable geometry portions of the engine such as inlet guide vanes, exhaust nozzles and the like, to likewise attain optimum operation for any given operation within the engine's operating envelope.

Hence, it is apparent that a change in one control function would affect the condition of others so that there would be constant iterations of each of the controls to assure optimum operation of each. For example, a change in the exhaust nozzle area would typically change the pressure within the engine, which pressure would be monitored by the fuel control, which in turn would manifest a change in the fuel control to ultimately adjust fuel flow to reflect this change. In this process the scheduling of the fuel flow either to increase or decrease fuel will occur even prior to the time it takes the variable geometry of the engine to react. This "bootstrapping" effect has been addressed in U.S. application Ser. No. 246,765 entitled Active Geometry Control System for Gas Turbine Engines, supra.

In this co-pending application, supra, the control attains a faster thrust response and improved surge margin by synchronously scheduling fuel flow and the variable geometries of the engine in response to a single parameter which is a function of certain engine and aircraft operating variables. In order for this type of active geometry control system to be a useful system, it must be able to attain a high degree of repeatability in assuring that for any given setting the control will return to a given steady state operating point in the operating curve after any transition excursion. During a transient excursion, the control logic will assure that the point of operation is identical to the setting of the power lever which request is desired thrust even though the engine operating variable changes as a result of wear and tear of the engine, power extraction or compressor air bleed.

This invention contemplates utilizing a corrected airflow of the low pressure spool (Wa) of a twin spool engine as the primary control parameter. As is the case in many of the military engines, the low pressure spool is only aerodynamically coupled to the high pressure spool. In order to attain the optimum engine operation from a performance standpoint, the corrected rotor speeds for the high and low pressure spool must be proportional to each other for every given steady-state engine condition.

In fighters and other military aircraft, it is extremely important that a demand by the pilot for a change in thrust produced by the engine be as fast and as accurate as possible. The aircraft's ability to undergo the violent maneuvers anticipated when operating in the combat box, for example, in fighter aircraft, bears directly on the performance of that aircraft. When a demand for a thrust change is initiated, for example, when the pilot exercises a bodie maneuver, i.e., a quick demand for a drop in thrust (decel) followed by an immediate demand for an increase in thrust (accel) or vice versa, the engine should attain the demanded thrust levels by decelerating to the desired thrust level before accelerating to the desired thrust level in the quickest time possible. With heretofore known control logic, maneuvers, such as these bodies as well as chops, are influenced by the constraints owing to the high inertia of the rotating spool. Since a thrust change necessitates a decrease or increase in RPM of the low pressure compressor, this high inertia adversely affects the time responsiveness of the engine.

Needless to say, it is also extremely important that the engine operates as efficiently as possible to achieve good TSFC (thrust specific fuel consumption) and stable engine operating conditions, namely, avoiding surge, engine flame out and overheating.

It has been found that by controlling both the fuel and the fan variable vanes as a function of corrected low pressure compressor airflow, both steady state and transient operations are enhanced. In transients, this invention contemplates locking in a fixed corrected low compressor speed ($N_1$), setting a target for the desired thrust and zeroing in on this target by adjusting the angle of the fan variable vanes. This logic allows the high pressure compressor spool to adjust speed to a value corresponding to the targeted airflow (Wa). A proportional plus integral controller assures that the engine airflow (Wa) is properly attained while $N_1$ is held constant. Once the target is reached, the active low compressor controller (ALCC) automatically trims the low pressure compressor spool speed and hence the low compressor speed and FCVV to return to the operating line at a value that is equivalent to the desired speed ratio of the high and low pressure compressor to assure optimum engine performance.

DISCLOSURE OF THE INVENTION

An object of this invention is to provide improved control logic for a two spool fan jet engine powering aircraft having variable area vanes on the fan that assures fast thrust response responsive to power lever input while assuring optimum TSFC when the engine operates in the quiescent state.

A feature of this invention is control logic of a two spool gas turbine engine that controls fuel flow and the fan variable vanes as a function of a low pressure compressor airflow parameter, which parameter is a function of Mach No., engine inlet total pressure and temperature and the position of the power lever. Transient conditions (accel and decel) are attained by locking in $N_1$, targeting Wa to attain the thrust level dictated by the demand of the power lever, and steady state conditions are attained by synchronously trimming the speed of the high pressure compressor and the position of the fan variable vanes until the designed low-to-high pressure compressor speed condition is reached.

Another feature of this invention is to utilize a timer that may be reset as a function of aircraft or engine operating variables to trim the control to a steady state condition once a thrust target has been achieved.

Another feature of this invention is to provide in control logic as described means for locking in the low pressure compressor speed as a function of the position of the power lever so that the lock condition will not deviate in deference to external influences, such as, wear and tear of the engine, and power extraction for aircraft accessories and the like.

The foregoing and other features and advantages of the present invention will become more apparent from the following description and accompanying drawings.

BEST MODE FOR CARRYING OUT THE INVENTION

As mentioned above this invention is particularly efficacious for military aircraft powered by a twin spool, axial flow fan jet. A typical installation where this invention would be applicable is for the F-100 family of engines manufactured by Pratt & Whitney Aircraft, a division of United Technologies Corporation, the assignee of this patent application, and reference should be made thereto for further details.

Figure 1:
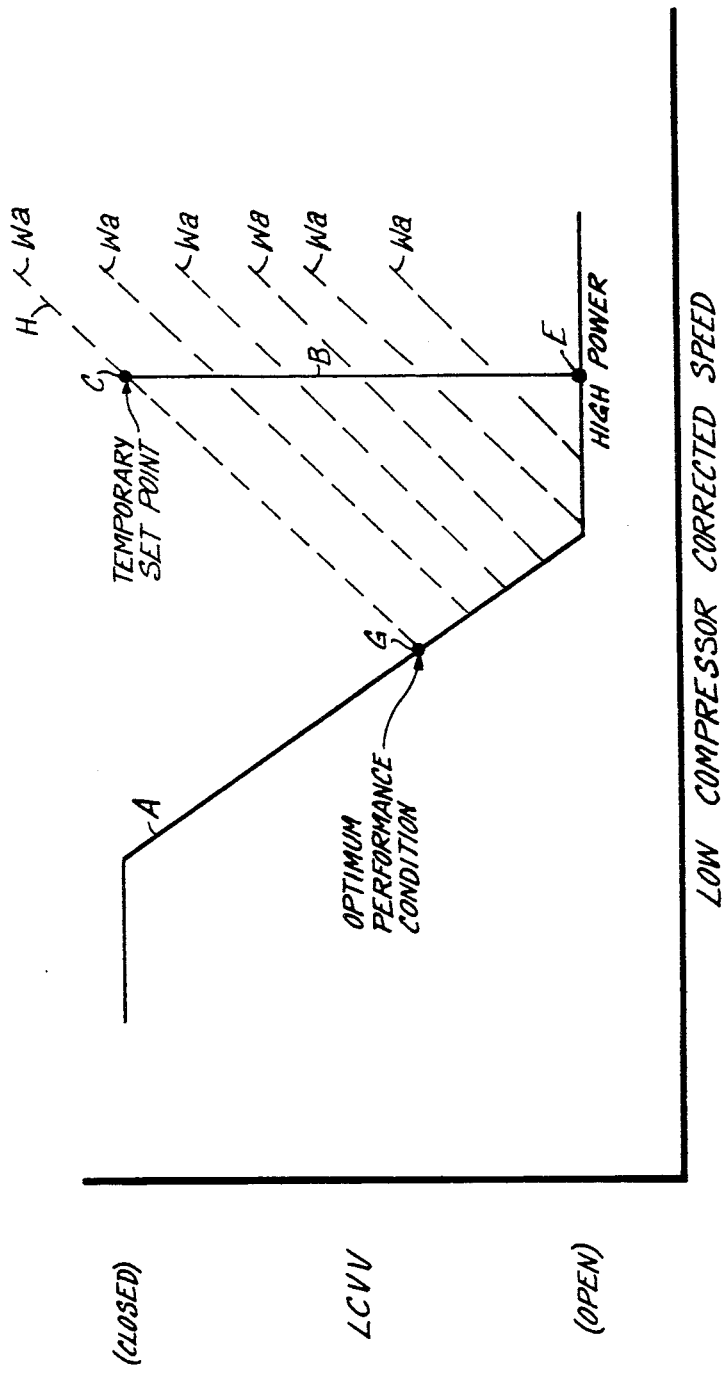
FIG. 1 is a graphical representation of the low spool operating line plotting the low compressor variable vane (LCVV) to the low pressure compressor speed ($N_1$) corrected for its inlet conditions illustrating the features of this invention.

To fully appreciate the objectives of this invention reference should be made to FIG. 1 which shows a typical operating line of the LCVV plotted against $N_1$ (unless otherwise specified all speed parameters are intended to be their corrected value). Since the fan and low pressure compressor are a unitary rotor and connected by the same shaft, the fan and low compressor speed are obviously identical. Curve A illustrates the usual operating line of the low speed compressor and, as noted, Fn and Wa increases as $N_1$ increases. Wa is corrected airflow parameter normalized as a function of total inlet temperature and pressure. In this particular plot showing the relationship of the LCVV, the vanes open at the high power conditions, close at low power condition and are modulated therebetween.

The operating line (Curve A) is manifested by the coordinated efforts of controlling fuel and the vanes which is typically controlled as a function of engine and aircraft operating variables. According to this invention rapid transients can be produced by controlling the LCVV such that low compressor airflow is modulated at constant or nearly constant $N_1$. Curve B is illustrative of a transient deceleration to a lower power thrust value identified as point C on Curve B. As is apparent from the graph, the active low compressor control (ALCC) serves to hold $N_1$ constant (Curve B) while modulating the LCVV until the engine attains the target (point C). If a bodie is exercised, the engine is accelerated back to the high power condition (point E) by again synchronously adjusting LCVV and fuel flow and controlling along curve B.

If the bodie maneuver in the above example is not exercised, $N_1$ would remain fixed at point C. In accordance with this invention, after a given interim the ALCC trims the LCVV and fuel flow to return the setting to the operating line (Curve A) to the steady state operating point illustrated by point G along the constant Wa line (Curve H in this example). This is the condition of optimum engine performance from a TSFC and stability standpoint.

While the example above describes a transient excursion at a selected airflow setting, these excursions will occur at any point along the operating line.

In its preferred embodiment the fuel control and ALCC are the electronic, digital type of controller and the fuel control may be, for example, the fuel control Model #EEC-104 manufactured by the Hamilton Standard division of United Technologies Corporation (incorporated herein by reference) or may be implemented by other mediums, such as, hydro-mechanical, electromechanical, and the like. As will be best understood by those skilled in the art, once the function's logic is understood, state-of-the-art technology can be implemented to execute this invention.

As is apparent from the foregoing, the control will operate to attain the gas generator ($N_2$) operating line by normal adjustment by the fuel control by the flow of fuel to the engine's combustor. Normal transients are likewise manifested in this manner. For rapid transient excursions, such as those contemplated when operating in the combat box, the control will automatically control the engine's acceleration and deceleration modes as a function of the primary control parameter Wa. Wa, therefore, is scheduled as a function of $\alpha$ which automatically sets engine thrust by direct scheduling of total engine airflow and engine pressure ratio by virtue of adjusting the fuel flow. LCVV controls $N_1$ so that rapid bodie chops and re-accels are possible because no $N_1$ speed change is required.

Figure 2:
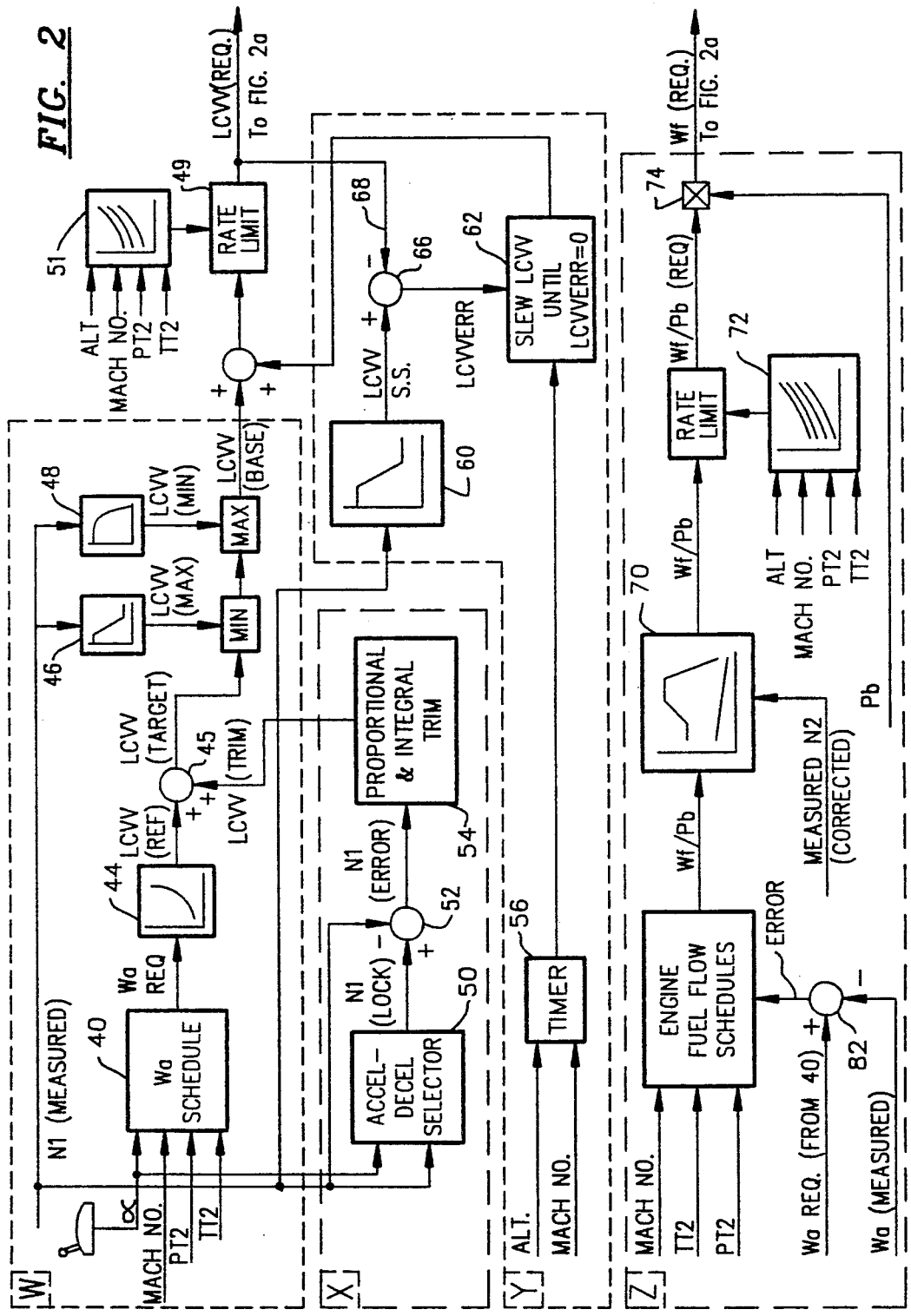
FIG. 2 and 2a are a schematic and block diagram illustrating the overall relationship of the control to the gas turbine engine and illustrating the control logic of this invention.
Figure 2A:
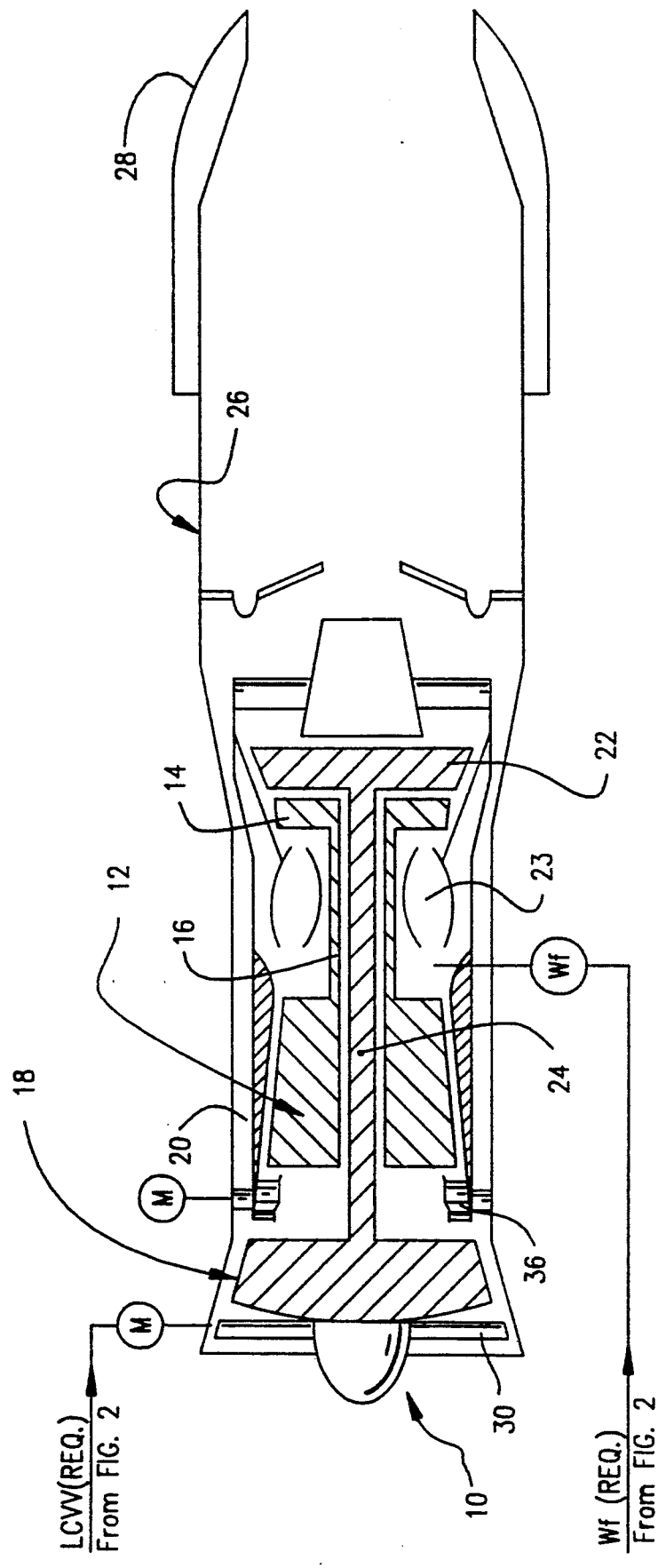

The type of engine for which this invention is particularly efficacious is schematically illustrated in FIG. 2 as being a fan jet engine generally illustrated by reference numeral 10 and comprised of an axial flow twin spool configuration. As schematically shown, the high pressure spool consists of a plurality of stages of compressors general y illustrated by reference numeral 12 driven by the high pressure turbine 14 and interconnected thereto by shaft 16.

The low pressure spool consists of the fan/low pressure compressor combination generally illustrated by reference numeral 18 where the fan portion discharges through the outer annular passageway 20 and the low pressure compressor discharges into the inlet of the high pressure compressor. Low pressure turbine stages 22 serve to power the fan/low pressure compressor 18 which is connected thereto by shaft 24. A suitable combustor 23 is interposed between the compressor section and turbine section where fuel is combusted to provide the working medium for powering the turbines and generating thrust. Fuel is fed to the combustor by throttle valve 25 as will be described hereinbelow.

The engine may utilize a suitable augmentor generally indicated by reference numeral 26 and a suitable variable jet nozzle 28. The engine has variable vanes 30 at the inlet of the fan and may also include variable vanes 36 in the high pressure compressor section.

As an understanding of the details of the engine are not necessary for an understanding of this invention, for the sake of convenience and simplicity, they are omitted herefrom. It is, however, necessary to understand that the invention is applicable in a single or multiple spool engine that has variable vanes at the inlet of the fan and/or low pressure compressor.

The electronic digital controller is comprised of four distinct circuits, W, X, Y and Z. While each of these circuits respond to a plurality of measured variables, these signals are interconnected to each of the circuits so that these signals are shared as needed.

Circuit W serves to derive a target thrust signal in accordance with the input of the power lever by scheduling engine airflow as a function of power lever position ($\alpha$), fan inlet pressure and temperature and aircraft Mach No. The output of the function generator 40 becomes the input to function generator 44 for setting an LCVV reference signal and is also used as an input to fuel flow circuit Z. The LCVV ref signal and the LCVV trim signals are applied to summer 45 and this value is the target value of the LCVV. The LCVV target value is restricted by a minimum and maximum limiter by the function generators 46 and 48 respectively as a function of actual $N_1$ corrected to inlet conditions. The output of summer 45 which the LCVV target sets is the LCVV request signal (LCVV req). As shown in block 49 in the block diagram, the LCVV req signal may be rate limited by function generator 51 as a function of altitude, Mach No., $P_{T2}$ and/or $T_{T2}$. It in FIG. 1, the target signal C which is the output of the summer 45 is attained by adjusting LCVV to maintain $N_1$ constant (scheduling along Curve B).

In circuit X, the accel/decel selector logic 50 locks a value of $N_1$ as a function of the motion of the power lever and is compared to the measured value of $N_1$ by summer 52 to provide an $N_1$ error signal. This difference is the input for a proportional-plus-integral controller 54 which is applied to summer 56 to trim LCVV to adjust $N_1$ to the $N_1$ lock value (Curve B of FIG. 1).

The decel timer 56 in circuit Y is activated by the decel signal from the accel/decel selector 50. Values of the timer 56 are set as a function of altitude and Mach No. At the termination of the signal produced by timer 56, the LCVV's are slewed from their temporary position to the steady state schedule (LCVVSS), scheduled by function generator 60 as a function of actual $N_1$ via the elimination of LCVVERR, the difference between the LCVV (req) and LCVVSS. The summer 66 schedules the LCVV steady state signal as a function of the LCVV vane position via feedback line 68. This function reduces LCVV to the normal steady state operating position (point G in the example in FIG. 1).

Fuel flow is regulated by circuit Z which schedules fuel flow by generating a $W_f/P_B$ signal as a function of the Wa request signal generated by the function generator 40 in the W circuit (where $W_f$ is fuel flow in pounds per hour and $P_B$ is the high compressor discharge pressure or the pressure of the engine's combustor. If the power lever is adjusted for an acceleration and then a deceleration, when timer 56 expires the Z circuit will adjust fuel flow to return the engine to operate on the steady state operating line A. Obviously, as the power lever is returned to the new Wa requested signal by virtue of the deceleration command input, a measured Wa with suitable signal compensation or a calculated Wa signal will be compared in comparator 82 with the scheduled Wa signal that is calculated in function generator 40 for producing an error signal. This error signal in turn becomes a bias signal in the engine fuel flow schedule for ultimately adjusting fuel flow.

The function generator 70 serves to limit the $W_f/P_B$ maximum and minimum values as a function of measured $N_2$ corrected to the inlet value. The $W_f/P_B$ may be rate limited as shown by the function generator 72 as a function of any number of engine and/or aircraft operating variables, such as, Alt., Mach No., $P_{T2}$ and $T_{T2}$. The request value is then multiplied by a suitable multiplier 74 by the measured $P_B$ value to produce a fuel flow ($W_f$) signal for driving the throttle valve 25 and regulating fuel flow to the engine's combustor.

OPERATION

Case 1 going from G to E (acceleration):

G represents cruise at optimum performance and is at a medium to low power level condition on the steady state operating line A. When the power lever ($\alpha$) calls for acceleration to high power point E on the steady state line A, function generator 40 would request a high Wa. The fuel flow ($W_f$) will increase to increase Wa to remove error between Wa measured and Wa request.

Initiation of the power lever ($\alpha$) "Locks" $N_1$ Lock value at point G. As $W_f$ increases measured $N_1$ increase error in 52 in the negative direction. Proportional-plus-integral controller 54 schedules vanes to open until point E is attained.

Case 2 going from E to C (deceleration):

When power lever ($\alpha$) is again initiated to new setting for a deceleration, selector 50 resets $N_1$ lock to high power (line B). Simultaneously, function generator 40 will reset Wa request to a lower value, generating a Wa error which results in the LCVV is scheduled closed by proportional-plus-integral trimmer 54 to achieve the targeted value (point C).

Case 3 going from C to G (return to steady state operating lines):

When timer 56 expires, function generator 62 will change LCVV request until LCVVERR is eliminated. As the LCVV opens, circuit Z will adjust the fuel flow to ensure that WA (error) is maintained at an acceptable low value, thus ensuing that the engine is returned to point G of the steady state operating line A along the required airflow line H.

The synchronization of the fuel flow rate of change and the LCVV (req) rate of change provide unique control and adjustment capability of the low pressure compressor operating line, especially during engine thrust decels. If the engine has been previously at high power and a thrust re-accel performed before the decel timer permits scheduling of LCVVSS, extremely fast thrust accelerations are possible since power is not dependent on low rotor speed re-acceleration.

Although this invention has been shown and described with respect to detailed embodiments thereof, it will be understood by those skilled in the art tat various changes in form and detail thereof may be made without departing from the spirit and scope of the claimed invention.

I claim:

1. For a gas turbine engine for powering aircraft having a pair of spools comprising a high pressure compressor/turbine combination and a fan/low pressure compressor and turbine combination solely aerodynamically coupled, a burner for combusting fuel and air for powering said turbines, fuel regulating means for regulating the flow of fuel to said burner and variable area vanes for regulating the air flow to said fan/low pressure, means for controlling said engine to operate on a low pressure compressor steady state operating line, the improvement comprising control means and including means for generating a signal indicative of $N_1$ lock responsive to low pressure compressor speed and the position of said power lever to regulate rapid accelerations and decelerations in response to a preselected low pressure compressor airflow parameter for controlling said variable vanes and said fuel regulating means, first means responsive to a plurality of engine and aircraft variables for generating a requested Wa signal, means responsive to the difference between $N_1$ lock and measured $N_1$ including a proportional and integral controller for adjusting said variable vanes to maintain said $N_1$ along a constant low pressure compressor speed selected by said $N_1$ lock and accelerate or decelerate said engine along a constant low pressure compressor speed to the targeted value selected by said power lever position, and additional control means responsive to said requested Wa signal for controlling said fuel regulating means and said variable vanes to return said engine to operate on said low pressure compressor steady state operating curve and timer means for actuating said additional control means upon reaching a predetermined time interval.

2. For a gas turbine engine as claimed in claim 1 wherein said low pressure compressor airflow parameter is a function of power lever position and an engine operating variable.

3. For a gas turbine engine as claimed in claim 2 wherein said engine operating variable is total pressure measured at the inlet of said fan/low pressure compressor.

4. For a gas turbine engine as claimed in claim 2 wherein said engine operating variable is total temperature measured at the inlet of said fan/low pressure compressor.

5. For a gas turbine engine as claimed in claim 2 wherein said low pressure compressor speed parameter is also a function of an aircraft operating variable.

6. For a gas turbine engine as claimed in claim 5 wherein said aircraft operating variable is Mach No.

7. For a gas turbine engine as claimed in claim 1 including rate limiting means for said additional control means wherein said timer and said rate limiting means respond to a function of aircraft Mach No. and altitude.

8. For a gas turbine engine as in claim 7 including means responsive to measured low pressure compressor speed to limit the minimum and maximum position of said variable vanes.

9. For a gas turbine engine as in claim 8 wherein said control for said fuel regulating means is responsive to a function of Wa request and measured high pressure compressor speed for generating a $W_f/P_B$ signal and means for multiplying said $W_f/P_B$ signal and measured burner pressure for generating a $W_f$ signal for controlling said fuel regulating means.

* * * * *

UNITED STATES PATENT AND TRADEMARK OFFICE
CERTIFICATE OF CORRECTION

PATENT NO. : 5,133,182

DATED : July 28, 1992

INVENTOR(S) : Juan A. Marcos

It is certified that error appears in the above-identified patent and that said Letters Patent is hereby corrected as shown below:

Col. 4, line 61, "general y" should read --generally--.

Col. 5, line 43, "It in" should read --It is apparent from the foregoing that in the example in--.

Col. 6, line 23, "The request" should read --The $W_f/P_B$ request--.

Col. 6, line 38, "increase" should read --increases--.

Col. 7, Claim 1, line 16, "sure, means" should read --sure compressor means--.

Signed and Sealed this

Thirtieth Day of November, 1993

Attest:

BRUCE LEHMAN

Attesting Officer

Commissioner of Patents and Trademarks